(12) United States Patent
Granat et al.

(10) Patent No.: US 6,343,428 B1
(45) Date of Patent: Feb. 5, 2002

(54) LABEL TO BE AFFIXED TO A SPOKED RIM

(75) Inventors: Jean-François Granat, Saint-Julien sur Veyle; Benoît Saint-Venant, Montceaux, both of (FR)

(73) Assignee: Mavic S.A., Saint Trivier sur Moignans (FR)

( * ) Notice: Subject to any disclaimer, the term of this patent is extended or adjusted under 35 U.S.C. 154(b) by 0 days.

(21) Appl. No.: 09/280,693

(22) Filed: Mar. 30, 1999

(30) Foreign Application Priority Data

Mar. 13, 1998 (FR) .............................. 98 04213

(51) Int. Cl.$^7$ ............... G09F 3/08; G09F 3/10
(52) U.S. Cl. ............ 40/638; 40/673; 40/299.01; 301/37.41; 33/203; 33/758
(58) Field of Search ............... 40/299.01, 587, 40/594, 630, 638, 673; 283/81; D12/213, 208, 114; D20/22; 301/37.1, 37.24, 37.41, 37.43; 33/203, 751, 758

(56) References Cited

U.S. PATENT DOCUMENTS

| | | | | | |
|---|---|---|---|---|---|
| 1,356,053 A | * | 10/1920 | Dunning | ................ | 40/638 |
| 2,654,168 A | * | 10/1953 | Heal | ................ | 40/587 |
| 3,017,148 A | * | 1/1962 | Wathen | ................ | 40/587 X |
| 3,423,861 A | * | 1/1969 | Forsyth | ................ | 40/662 |
| 3,517,450 A | * | 6/1970 | Greco | ................ | 40/310 |
| 3,579,408 A | * | 5/1971 | Dowhan | ................ | 301/37.41 X |
| 3,832,969 A | * | 9/1974 | Rapoza et al. | ................ | 283/81 |
| D233,336 S | * | 10/1974 | Channing et al. | ................ | D20/22 |
| D245,290 S | * | 8/1977 | Kingsford | ................ | D20/22 X |
| 4,470,663 A | * | 9/1984 | Tresch et al. | ................ | 301/37.41 X |
| 5,441,334 A | * | 8/1995 | Botterman et al. | ................ | 40/587 X |
| D378,767 S | * | 4/1997 | Chapman et al. | ................ | D20/22 |

FOREIGN PATENT DOCUMENTS

| | | |
|---|---|---|
| BE | 886550 | 4/1981 |
| DE | 3533152 | 3/1987 |
| EP | 039021 | 11/1981 |

* cited by examiner

*Primary Examiner*—Brian K. Green
(74) *Attorney, Agent, or Firm*—Greenblum & Bernstein, P.L.C.

(57) ABSTRACT

Spoked wheel rim having a predetermined number of borings distributed on its periphery provided to hook spokes, wherein a label is applied to a surface of the rim. The label has a tongue of a length at least equal to the distance between two successive borings on the rim. The tongue has a first marker centered on a first boring of the rim and a scale of, one of, markers or identifying indices indicating the number of borings on the rim. The scale is located near a boring adjacent to the first boring. The boring adjacent to the first boring is located opposite a marker or identifying index of the scale to indicate the number of borings on the rim.

19 Claims, 2 Drawing Sheets

LABEL TO BE AFFIXED TO A SPOKED RIM

CROSS-REFERENCE TO RELATED APPLICATIONS

The instant application is based upon the French priority patent application No. 98 04213, filed Mar. 31, 1998, the disclosure of which is hereby expressly incorporated by reference thereto in its entirety, and the priority of which is hereby claimed under 35 U.S.C. 119.

BACKGROUND OF THE INVENTION

1. Field of the Invention

The invention relates to a label provided for being affixed to a spoked rim for a two-wheeled vehicle, such as a bicycle. The invention also relates to a rim and a spoked cycle wheel equipped with such a label.

2. Description of Background and Relevant Information

In a known way, a bicycle rim is produced from a segment of a curved section whose two ends are joined end-to-end. The ring thus formed is bored with holes, the number of which corresponds to the number of spokes provided to equip the wheel. Most often, these holes are alternately offset in the direction of the edges of the rim and, if necessary, they are equipped with eyelets which are crimped into the rim and which serve as supports for the spoke nipples. The number of spokes can vary according to the mechanical properties sought for the wheel, particularly the rigidity and the weight. As a general rule, the same rim profile provided for a bike can be bored according to two, three, or four different modes, the most common values being 24, 28, 32, or 36 holes per wheel rim.

During the assembly of the wheel, it is important to know, or in somes cases to verify, the number of borings in the rim in order to make the correct choice of components and produce the correct assembly.

It is of course possible to apply to the rim a label indicating the number of borings in the rim. However, this requires keeping various types of labels in stock in accordance with the numbers of borings, and the risk of an error exists at the moment the labels are affixed. The rims for which this is the case are incorrectly identified.

SUMMARY OF THE INVENTION

An object of the invention is to overcome the disadvantages noted above by proposing a single label that indicates the number of borings in the rim regardless of that number, and which thereby eliminates any risk of error in identifying the rim.

The label according to the invention is provided for identifying a batch of rims wherein the number of borings is predetermined and variable between a minimum number and a maximum number. It exists in the form of a plate, or layer of material, whose length is provided to cover at least the distance between two successive holes of a rim having the minimum number of borings. It includes a first mark provided to be centered on a first boring in the rim, and a straight edge located in the area of an adjacent boring in the rim and oriented in a longitudinal direction, with a scale of marks or indicators along the straight edge corresponding to values identifying the number of holes in the rim, each of the marks or indicators of the scale that identifies a number of borings being separated from the first hole by a distance equal to the distance between two adjacent borings of a rim bored by the number of borings in question.

In other words, the invention proposes to reproduce on a label a hyperbolic scale wherein the graduations correspond to the relation "d×n=k," wherein "d" designates the distance from the original graduation, "n" designates the number of borings in the rim to which this graduation corresponds, and "k" is the circumference of the inner wall of the rim, this value being constant for rims of the same type. Preferably, only graduations that correspond to commonly used numbers of borings are indicated on the scale. However, this is not limiting.

The label is then affixed to the rim in such a way that the origin of the scale corresponds to a first boring. It is possible to directly read the number of borings on the scale, based on the position of an adjacent boring.

BRIEF DESCRIPTION OF DRAWINGS

The invention will be more clearly understood by referring to the description below and to the attached drawings, which are an integral part of same.

DETAILED DESCRIPTION OF THE INVENTION

Figure 1:
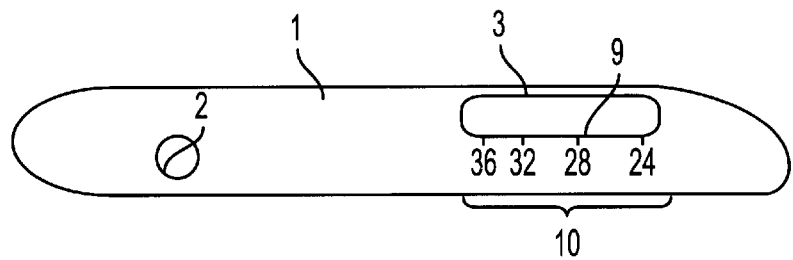
FIG. 1 is a top view of a label according to a first embodiment of the invention.

FIG. 1 represents a top view of a label according to a first embodiment of the invention.

The label is formed by an elongated plate 1 whose two lateral edges are rectilinear, and whose two ends are rounded. However, this shape is not limiting, and any appropriate shape is suitable.

In a known way, the label has a visible side which is embossed or imprinted, and a non-visible side that is covered with a self-adhesive layer. The non-visible side is protected by a protective strip which is removed before the application of the label to its support. This is common, and will not be described in detail.

The length of the plate is enough to cover two successive borings of a rim.

For example, for a bicycle rim that is provided to be bored with 24, 28, 32, or 36 holes, the length of the label is greater than the distance between two successive borings of a rim having 24 borings, and it is less than three times the distance between two successive borings of a rim having 36 borings, in order to cover two successive borings for all rims. In a practical way, for a street bike rim whose inner diameter of the ring is approximately 60.5 centimeters, the length of the label is approximately between 8 and 15 centimeters.

More generally, for a batch of rims provided to be bored with a variable and predetermined number of borings, the length of the label is greater than one times the distance between two successive borings in the rim having the lowest number of borings, and it is less than three times the distance between two successive borings of the rim having the highest number of borings.

The plate 1 has a first hole 2. This hole is provided to be centered on a first boring. It is preferably round and has a diameter approximately equal to the diameter of the boring. Since most often the borings in the rim are alternately offset toward one edge of the rim, the hole 2 is also offset toward one edge of the plate, The hole could possibly be made slightly oblong in a transverse direction in order to make the label compatible with more or less substantial transverse offsets of the boring in the rim.

The plate also has a second hole 3, which is oblong and whose length is oriented in the longitudinal direction of the label. The hole 3 is provided to be placed over a boring in the rim adjacent to the preceding first boring. As a result, the hole is offset toward the other edge of the label. The two ends of the oblong hole 3 are located at a distance from the first oblong hole that is respectively smaller than the distance between two successive borings for a rim having the highest number of borings, and larger than the distance between two successive holes of a rim having the lowest number of holes. For the previously mentioned wheel rim, the distance between two successive borings varies between approximately 5.2 centimeters for a rim having 36 holes, and 7.8 centimeters for a rim having 24 holes. The two ends of the oblong hole 3 are located at distances that are, respectively, smaller and larger than these two values.

Figure 2:
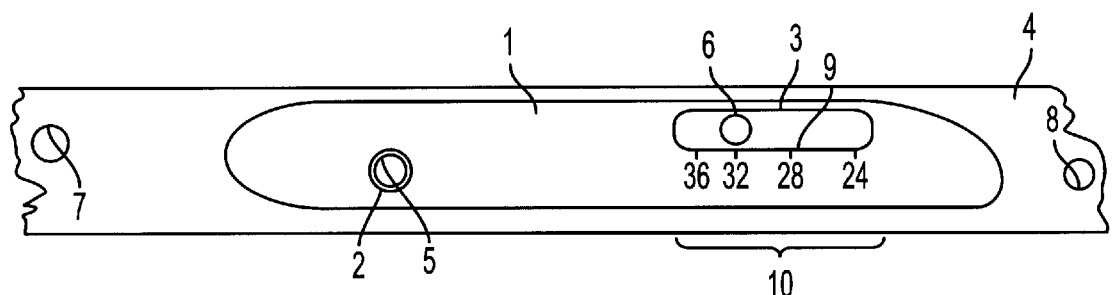
FIG. 2 represents the label of FIG. 1 affixed to the lower bridge of a rim portion.

In this way, regardless of the number of borings in the rim, the adjacent boring appears through the oblong hole 3. FIG. 2 shows the label 1 affixed to the lower bridge of a rim portion 4. The first hole 2 is centered on a first boring 5 in the rim, and the adjacent boring 6 appears in the median part of the oblong hole 3.

On one edge 9 of the oblong hole 3, the label 1 has a scale of marks 10. The marks on the scale correspond to the various numbers of borings possible, "24,""28,""32,""36" in the example represented in the figures.

Each of the marks is separated from the first hole 2 by a distance that is approximately equal to the distance between two successive borings measured on rims bored with the various numbers of borings possible. In this way, the mark located facing the adjacent hole 6, i.e., the mark 32 in FIG. 2, directly indicates the number of borings in the rim. In other words, the scale 10 is provided so that the number of borings is read directly from the position of the adjacent boring 6 along the scale. Thus, there is no risk of erroneous identification in the labeling, since there is only one label, and the information is read according to the relative position of two adjacent borings.

Each of the marks is separated from the first hole 2 by a distance that is approximately equal to the distance between two successive borings measured on rims bored with the various numbers of borings possible. In this way, the mark located facing the adjacent hole 6, i.e., the mark 32 in FIG. 2, directly indicates the number of borings in the rim. In other words, the scale 20 is provided so that the number of borings is read directly from the position of the adjacent boring 6 along the scale. Thus, there is no risk of erroneous identification in the labeling, since there is only one label, and the information is read according to the relative position of two adjacent borings.

By way of example, it was found that for a wheel rim, the distance with respect to the first hole 2 was 5.2 mm for the mark "36,"5.8 mm for the mark "32,"6.7 mm for the mark "28," and 7.8 mm for the mark "24." These figures are given only as examples and are not intended to represent limiting values.

Instead of marks, the scale 10 could have indicators, color codes or any other appropriate method of identification.

Likewise, the scale could also be located on the other edge of the oblong hole 3, or could be distributed on both edges of the oblong hole 3.

In addition to these ways of identification, the label could bear any other marking of a technical or commercial nature.

Figure 3:
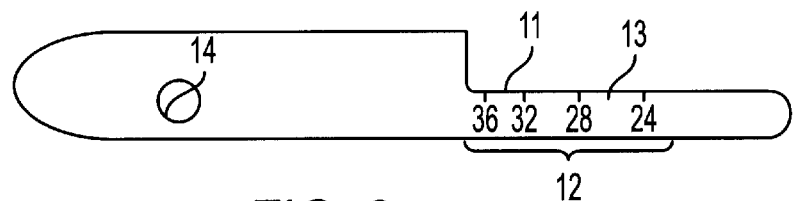
FIG. 3 relates to a variant of the invention.

FIG. 3 shows a variant embodiment. According to this variant, the oblong hole 3 is replaced by a type of ruler 13, and the scale 12 is located on the edge 11 of this ruler. The label also has an opening 14 that is provided to be centered on a first boring 5.

Figure 4:
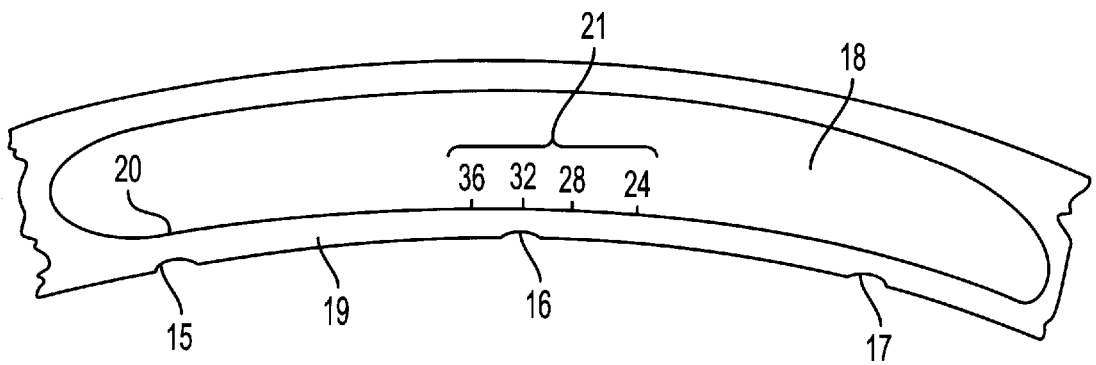
FIG. 4 illustrates a variant adapted to another rim profile.

FIG. 4 relates to another embodiment of the invention, more specifically adapted to a rim that has in cross-section a very high triangular profile, the borings for the spokes being located at the level of the internal ridge of the profile. For a rim of this type, the most appropriate area to affix a label is on one of the lateral flanks, and as shown in FIG. 4, the borings such as the borings 15, 16 and 17 appear at the base of the flank.

The label 18 has a rounded shape that follows the curvature of the flank of the rim, and it has a lower edge 19 that is located near the internal ridge of the profile. Since in this case the label does not cover any opening in the rim, its maximum length is not limited. The minimum length, on the other hand, is greater than the distance between two adjacent borings on a rim having the highest number of borings.

Along its edge 19, the label has a first mark 20, for example, formed by a line that is provided to be centered by being aligned with respect to a first boring 15. Further on, the label has a scale of marks 21 that makes it possible to identify the number of borings in the rim. The position of the various marks of the scale 21 is determined in the same way as previously described. As in the preceding case, the number of borings is read directly from the mark located facing the adjacent boring 16.

Figure 5:
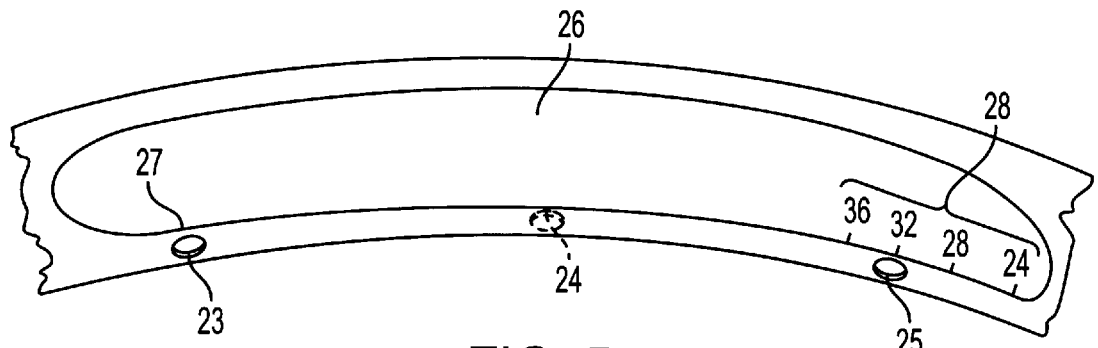
FIG. 5 illustrates a variant adapted to a still further rim profile.

FIG. 5 relates to a variant embodiment provided for a rim of the same type as the rim in FIG. 4, the difference being that the borings are slightly offset alternately on either side of the internal ridge. As shown in FIG. 5, a first boring 23 is visible on the side, but the next boring 24 is not visible since it is offset toward the other flank of the rim.

The boring 25 located after he boring 24 is visible on same flank as the first boring 23. It is this boring 25 that is used here as the adjacent boring.

In this case, the label 26 covers at least double the distance between two successive borings. It has a first mark 27 centered by being aligned with a first boring 23, and a scale 28 located at the height of an adjacent boring 25 which opens out on the same flank as the first boring 23. The scale 28 has been expanded to accommodate the more substantial distance of the adjacent boring 25.

The invention is not limited to the embodiments described and other variants are possible. In particular, the invention can be applied to any rim profile other than those that have been presented, particularly rims for mountain or dirt bikes. In addition, the word boring should be interpreted in the broadest sense, i.e., this term also includes the eyelet crimped into the opening, when this eyelet is present. Also, in the case where eyelets are placed on the rim the label of the invention can be affixed before or after the placing of the eyelets. Lastly, the scale indicated on the label could be partial, i.e., including only one or two marks, the reading of the number of borings being performed as a function of the relative position of the adjacent boring with respect to the mark(s).

What is claimed is:

1. A spoked cycle rim having a predetermined number of borings which may vary between a lower number and a higher number and a label for identifying the number of borings in the rim, said label having a length provided to cover at least a distance between two adjacent borings on the rim, the label comprising a first mark provided to be centered on a first boring of the rim, and an edge provided to be located in an area of an adjacent boring of the rim and oriented in a longitudinal direction, and along the edge, a scale of marks or indicators corresponding to values identifying the number of borings on the rim, each of the marks or indicators being separated from the first mark by a distance equal to the distance between two adjacent borings measured on the rim.

2. The spoked cycle rim according to claim 1, wherein the first mark on the label comprises a round hole centered on a first opening on the rim.

3. The spoked cycle rim according to claim 1, wherein the first mark on the label comprises a line aligned with an opening of the rim.

4. The spoked cycle rim according to claim 1, wherein the edge is one of the edges of an oblong opening.

5. The spoked cycle rim according to claim 1, wherein the scale comprises a ruler.

6. The spoked cycle rim according to claim 1, wherein the edge is the edge of the label.

7. The spoked cycle rim according to claim 1, wherein the rim is used in combination with a wheel for a cycle.

8. In combination, a batch of spoked cycle rims having a predetermined number of borings which may vary between a lower number and a higher number and a label for identifying the number of borings in the rims, said label having a length provided to cover at least a distance between two adjacent borings on a rim having the lowest number of borings, the label comprising a first mark provided to be centered on a first boring of the rim having the lowest number of borings, and an edge provided to be located in an area of an adjacent boring of the rim having the lowest number of borings and oriented in a longitudinal direction, and along the edge, a scale of marks or indicators corresponding to values identifying the number of borings on the rim having the lowest number of borings, each of the marks or indicators being separated from the first mark by a distance equal to the distance between two adjacent borings measured on the rim having the lowest number of borings.

9. The combination according to claim 8, wherein the label comprises graduations which correspond to the relation "d×n=k", wherein:

"d" designates the distance from an original graduation,

"n" designates the number of borings in the rim to which the graduations correspond, and "k" designates the circumference of an inner wall of the rims.

10. The combination according to claim 9, wherein "k" is constant for rims of the same type.

11. The combination according to claim 9, wherein the graduations correspond to a variable number of borings.

12. The combination according to claim 8, wherein the scale has an origin and the label is affixed to the rim having the lowest number of borings in a way that the origin of the scale corresponds to the first boring, so as to enable reading of the number of borings on the scale based on the position of a boring adjacent to said first boring.

13. A spoked wheel rim comprising a predetermined number of borings distributed on its periphery provided to hook spokes, wherein a label is applied to a surface of the rim, the label having a tongue of a length at least equal to the distance between two successive borings on said rim, the tongue having a first marker centered on a first boring of the rim and a scale of, one of, markers or identifying indices indicating the number of borings on the rim, the scale being near a boring adjacent to said first boring, the boring adjacent to the first boring being opposite a marker or identifying index of the scale to indicate the number of borings on said rim.

14. The spoked wheel rim according to claim 13, wherein the first marker comprises a round hole centered on said first boring.

15. The spoked wheel rim according to claim 13, wherein the first marker comprises a line aligned with an opening on the rim.

16. The spoked wheel rim according to claim 13, wherein the markers or identifying indices comprise graduations which correspond to the relation "d×n=k", wherein:

"d" designates the distance from an original graduation,

"n" designates the number of borings in the rim to which the graduations correspond, and "k" designates the circumference of an inner wall of the rims.

17. The spoked wheel rim according to claim 16, wherein "k" is constant for rims of the same type.

18. The spoked wheel rim according to claim 17, wherein the graduations correspond to a variable number of borings.

19. In combination, a batch of spoked cycle rims having a predetermined number of borings which may vary between a lower number and a higher number and a label for identifying the number of borings in the rims, said label having a length provided to cover at least a distance between two adjacent borings on a rim having the lowest number of borings, the label comprising a first mark provided to be centered on a first boring of the rim having the lowest number of borings, and an edge provided to be located in an area of an adjacent boring of the rim having the lowest number of borings and oriented in a longitudinal direction, and along the edge, a scale of marks or indicators corresponding to values identifying the number of borings on the rim having the lowest number of borings, wherein the scale has an origin and the label is affixed to the rim having the lowest number of borings in a way that the origin of the scale corresponds to the first boring, so as to enable reading of the number of borings on the scale based on the position of a boring adjacent to said first boring, each of the marks or indicators being separated from the first mark by a distance equal to the distance between two adjacent borings measured on the rim having the lowest number of borings, the label comprising graduations which correspond to the relation "d×n=k", wherein:

"d" designates the distance from an original graduation,

"n" designates the number of borings in the rim to which the graduations correspond, and "k" designates the circumference of an inner wall of the rims and is constant for rims of the same type.

* * * * *